United States Patent
Burkhart et al.

(10) Patent No.: US 7,612,159 B2
(45) Date of Patent: Nov. 3, 2009

(54) PROCESS FOR WORKING UP POLYETHERSILOXANES

(75) Inventors: George Burkhart, Essen (DE); Horst Dudzik, Essen (DE); Wolfgang Hiersche, Essen (DE); Wilfried Knott, Essen (DE); Volker Möhring, Mülheim (DE)

(73) Assignee: Goldschmidt AG, Essen (DE)

( * ) Notice: Subject to any disclaimer, the term of this patent is extended or adjusted under 35 U.S.C. 154(b) by 982 days.

(21) Appl. No.: 10/740,064

(22) Filed: Dec. 18, 2003

(65) Prior Publication Data

US 2004/0132951 A1 Jul. 8, 2004

(30) Foreign Application Priority Data

Dec. 21, 2002 (EP) ................... 02028830

(51) Int. Cl.
*C08G 77/04* (2006.01)
(52) U.S. Cl. .............. 528/29; 528/31; 528/15; 528/25; 556/445; 568/673; 568/675; 521/122; 516/13
(58) Field of Classification Search ............ 528/31, 528/15, 29, 25; 556/445; 568/673, 675; 521/122; 516/13
See application file for complete search history.

(56) References Cited

U.S. PATENT DOCUMENTS

| | | | | |
|---|---|---|---|---|
| 4,720,353 A | * | 1/1988 | Bell | 516/23 |
| 5,472,987 A | * | 12/1995 | Reedy et al. | 521/106 |
| 5,986,122 A | * | 11/1999 | Lewis et al. | 556/445 |
| 6,372,874 B1 | * | 4/2002 | Cameron | 528/21 |
| 6,737,049 B1 | * | 5/2004 | Kim et al. | 424/70.1 |
| 2004/0110850 A1 | * | 6/2004 | Jordan et al. | 516/55 |

FOREIGN PATENT DOCUMENTS

| | | |
|---|---|---|
| EP | 0 118 824 A1 | 9/1984 |
| EP | 0 308 260 A2 | 3/1989 |
| EP | 0 398 684 A2 | 11/1990 |
| EP | 41 16 419 C1 | 8/1992 |
| WO | 00/11051 * | 3/2000 |

OTHER PUBLICATIONS

STN search report on CAS Registry No. 68937-55-3.*
Patent Abstracts of Japan, Publication No. 07304627 A, Publication Date, Nov. 21, 1995.
Patent Abstracts of Japan, Publication No. 09012723 A, Publication Date, Jan. 14, 1997.
Patent Abstracts of Japan, Publication No. 09095536 A, Publication Date, Apr. 8, 1997.
Patent Abstracts of Japan, Publication No. 609018525 A, Publication Date, Jan. 30, 1985.
S. Ichinohe et al., "Non-Odor Type of Polyether Modified Silicones for Cosmetic", J. Soc. Chem. Japan, vol. 27, No. 3, pp. 297-303, 1993.

* cited by examiner

*Primary Examiner*—Kuo-Liang Peng
(74) *Attorney, Agent, or Firm*—Frommer Lawrence & Haug LLP

(57) ABSTRACT

The invention relates to a process for working up polyethersiloxanes, wherein said polyethersiloxanes are treated with $H_2O_2$ and are separated from volatile components by separation methods known per se.

9 Claims, No Drawings

PROCESS FOR WORKING UP POLYETHERSILOXANES

RELATED APPLICATIONS

This application claims priority to European application Serial No. 2022830.4, filed Dec. 21, 2002, herein incorporated by reference.

BACKGROUND OF THE INVENTION

1. Field of the Invention

Organomodified siloxanes, in particular polyethersiloxanes are widely used compounds in virtually all areas in which control of surface-active behavior is important. The range of use of this class of substances is based not least on the possibility of establishing a variety of action principles in a controlled manner by a suitable combination of siloxane skeleton and polyethers as substituents.

The standard reaction for the organomodification of hydrogen siloxanes is platinum-metal catalyzed hydrosilylation. The industrial synthesis of the Si—C-linked polyethersiloxanes is based to a considerable extent on the use of the readily available allylpolyether.

In the case of the polyether-modified siloxanes, prepared by the process described above from allylpolythers and hydrogen siloxanes, considerable excess amounts of the polyether components are used in some cases to ensure a quantitative SiH conversion and hence to avoid evolution of $H_2$ from the end product. This procedure is explained by the fact that, in addition to the desired Si—C linkage, varying degrees of isomerization of the allylpolyether used to give the corresponding, thermodynamically more stable propenylpolyether are observed. The propenylpolyether is not accessible to an Si—C linkage under the customary conditions of hydrosilylation.

However, undesired properties of the polyethersiloxanes result from the presence of propenylpolyether. Under the influence of traces of acid and moisture, the propenylpolyether undergoes hydrolysis; in other words, propionaldehyde is liberated over a certain period. As a result of secondary reactions, linear and/or cyclic oligomers (aldoxanes, trioxanes) also readily form from the propionaldehyde and have a tendency to cleavage and hence for the liberation of aldehyde again. Products which are required to have a neutral odor (for example for applications in the cosmetics sector) therefore require an aftertreatment.

If, moreover, compounds carrying hydroxyl groups (for example, siloxane-bonded polyetherols) are contained in the aldehyde-contaminated system, acetals which may distort the physicochemical property profile of the desired product, for example by increasing the viscosity as a result of the increase in molar mass, etc., may readily form.

2. Description of the Related Art

The prior art discloses very different methods for avoiding or eliminating the problems described in the case of allylpolyether-based systems:

EP-A-0 118 824 describes organopolysiloxane/polyoxyalkylene copolymers as oils for cosmetic purposes, having a total content of compounds carrying carbonyl groups (aldehydes+ketones) of $\leq 100$ ppm and a peroxide content of $\leq 5$ milliequivalents/kg of substance, which are obtainable by using antioxidants in amounts of 5 to 1000 ppm, if required in the presence of a buffer during the hydrosilylation linkage reaction of allylpolyethers which are already very pure.

JP-A-07304627 teaches a process for the treatment of organosiloxanes carrying allylpolyethers by mixing them with aqueous hydrochloric acid at 60° C. in the course of 24 hours. The aldehyde content obtained is $\leq 100$ ppm and the odor test is negative.

A comparable procedure for the acid-induced hydrolysis of propenylpolyether moieties with liberation, and the consequently possible removal of propionaldehyde is described in J. Soc. Cosmet. Chem. Japan (1993), 27(3), 297-303.

DE-A-41 16 419 relates to the elimination of undesired odor sources in the allylpolyethersiloxane by heterogeneously catalyzed hydrogenation under pressure over nickel/kieselguhr catalysts, colorless transparent products without a penetrating odor being obtained, which are stable in the aqueous acidic system and in a pH range of from 3 to 4 for a period of 6 weeks.

EP-A-0 398 684 describes the preparation of polyoxyalkylene/silicone block copolymers having little odor by reacting a hydrogen siloxane with allylpolyethers in ethanol under Pt catalysis and treating the reaction mixture with a dilute hydrochloric acid solution at elevated temperatures for a few hours and then subjecting it to a vacuum distillation, a virtually odorless copolymer being obtained.

The prior art furthermore describes the possibility of suppressing undesired odor in allylpolyethersiloxanes by adding small amounts of phytic acid, which however remains in the system (JP-A-60018525).

The indirect routes taken to avoid the problems resulting from the allylpolyether isomerization are disclosed, for example, in EP-A-0 308 260, which claims a process for the preparation of highly pure oxyalkylene-modified organopolysiloxanes using vinyloxy-terminated polyethers. Because of limited availability and high raw material costs, this preparation route cannot be extended as desired.

JP-A-09012723, too, makes use of an avoidance strategy which replaces the hydrogen atoms in position 3 of the polyether-bonded allyl group by hydrocarbon substituents. Of course, a system modified in this way does not suffer from any allyl-propenyl rearrangement during the hydrosilylation.

On evaluating all these processes, it is found that no process is suitable for use for all allylpolyethersiloxanes in a very wide range of applications. Additives inherent in the system, such as antioxidants and complexing acids (phytic acid), prevent the use of the copolymers treated in this manner in various applications, for example in the cosmetics or paint sector.

Processes such as the heterogeneously catalyzed hydrogenation under pressure are complicated and expensive and hence acceptable only for small-volume, high-priced application areas of the silicone polyethers. If in particular those silicone polyethers which are used in the form of foam stabilizers in the preparation of polyurethane foams and have a complex structure are included in this consideration, insufficiencies of an acid treatment or of a combined acid/alcohol treatment of the corresponding block copolymers are also evident.

Attempts to treat these functional surfactants with acid under moderate conditions illustrate the disastrous effect of this method on the suitability for use as foam stabilizers, in particular in hot flexible foam systems. Instead of the desired foam stabilization, a collapse of the labile foam structure is observed.

JP-A-09095536 is concerned with the preparation of highly pure siloxanes containing oxyalkylene groups as modifiers for polyurethanes. The adducts of very short-chain allyl-ethyleneoxy-propyleneoxy-ethers having ($M \leq 250$ g/mol) with hydrogen siloxanes are considered here. After the end of the addition reaction, the crude product is subjected to a treatment with stripping gas at 150° C. and reduced pressure (5 mmHg). These conditions are sufficient for virtually completely removing unconverted low molecular weight ethers, such as, for example, propylene glycol monoallyl ether, from the end product. In the case of the allylpolyethersiloxanes whose polyether base comprises molar masses of about 400-10 000 g/mol, however, propenyl-containing moieties cannot be eliminated permanently and completely in this manner.

OBJECTS OF THE INVENTION

It is thus an object of the present invention to provide an economical and gentle process for working up, in particular for purifying, allylpolyethersiloxanes, which leads to virtually permanently odorless and low-emission products which moreover are improved in their performance characteristics. Further, it is an object of the invention to provide a purification process for allylpolyethersiloxanes which fulfill the stringent criteria of hot flexible foam stabilizers. These and other objects will become apparent from the Description of the Invention.

DECRIPTION OF THE INVENTION

It has surprisingly been found that allylpolyethersiloxanes can be freed from odor-forming impurities and cyclic siloxanes ($D_4$, $D_5$, $D_6$) in a gentle and permanent manner by treatment with aqueous $H_2O_2$. In addition, it was not foreseeable that a gain in performance, especially in the case of the stabilizer systems used in the hot flexible foam, is also associated with this method of deodorization.

For a person skilled in the art, this is all the more surprising since aqueous solutions of hydrogen peroxide are otherwise known to be used for fragmenting the organic load of poorly biodegradable wastewaters so that the resulting fragments are readily metabolized by microorganisms.

If the process comprising a treatment with aqueous $H_2O_2$ claimed here according to the invention is followed, this type of product-damaging oxidative degradation is surprisingly not observed.

The invention therefore relates to a process for working up polyethersiloxanes, wherein said polyethersiloxanes are treated with $H_2O_2$ and are freed from volatile components by the separation methods known per se.

The concentration of the hydrogen peroxide solution used in the method according to the invention is based on the one hand on the necessity of achieving the desired purification effect in a relatively short time but on the other hand also on the avoidance of product-damaging, oxidative degradation. Thus, an aqueous solution containing between about 0.1 and about 10% by weight of $H_2O_2$, in particular between about 2 and about 8% by weight of $H_2O_2$ particularly preferably between about1 3 and about 5% by weight of $H_2O_2$, is preferably used.

A consideration similar to that in the case of the described concentration in which the aqueous hydrogen peroxide solution is used also applies in the case of the amount of reagent solution to be used, based on the amount of silicone polyether to be treated. The amount of $H_2O_2$ used should on the one hand be sufficient for permanent removal of odor-forming components from the reaction mixture; on the other hand, an unnecessary excess should be avoided because of process economy and also because of the object for reducing wastewaster streams.

The hydrogen peroxide solution is expediently used in amounts which correspond to a content of from about 0.05 to about 5% by weight, preferably from about 0.1 to about 1% by weight, of pure $H_2O_2$, based on the polyethersiloxane to be treated.

These amounts are sufficient for the polyethersiloxanes prepared by the standard reaction by means of platinum metal-catalyzed hydrosilylation. If, because of particular circumstances, other compositions of the reaction mixtures result, the effective amount of $H_2O_2$ then required can be determined by simple exploratory experiments.

The silicone polyether should be brought into contact with the aqueous $H_2O_2$ solution in a temperature range between about 50° C. and about 140° C., particularly preferably between about 90° C. and about 120° C.

At the temperatures preferred according to the invention in the upper range, i.e. about 90° C. or higher, a treatment time of only a few minutes is sufficient for achieving the success strived for. In the lower temperature range, the treatment time naturally increases somewhat. It is, however, still substantially shorter than in the case of the processes according to the prior art, such as, for example, hydrogenation or steam treatment.

Measures which relate to apparatus and are concerned with increasing the size of the phase boundary between organic and aqueous phase, such as, for example, high-speed stirrers, installation of static mixers or the like, have an advantageous effect on the process.

After the treatment with $H_2O_2$, according to the invention, the reaction mixture is freed from volatile components by the separation methods known per se, preferably by distillation at elevated temperatures and optionally reduced pressure.

In the context of the present invention, Si—C-linked siloxanes are particularly preferably subjected to the treatment with $H_2O_2$, according to the invention, since said siloxanes have less tendency to hydrolyze than Si—O—C-linked siloxane and moreover are prepared by a different route. By kinetic control, however, these siloxanes too can be worked up according to the invention.

If, for example, polysiloxane/polyoxyalkylene block copolymers which have different polyoxyalkylene blocks in the average molecule (EP-B-0 585 771) are subjected to a treatment with a solution of $H_2O_2$ in water and the resulting multiphase system of substances is subjected to a thermal separation, a considerable amount of propionaldehyde together with water is expelled from the copolymer. At the same time, the content of siloxane cycles ($D_4$, $D_5$, $D_6$) also decreases. In association with the decrease in concentration of volatile components, not only is an increase in the activity of the treated foam stabilizer observed but its tendency to control a finely cellular polymer foam is also increased.

By means of the process according to the invention, the polyethersiloxanes can be permanently freed from odor-forming components before the removal of the volatile component by the process known per se alone, by brief thorough mixing with an aqueous $H_2O_2$ solution, optionally at elevated temperature. The $H_2O_2$ introduced (in excess) decomposes into $H_2O$ and $O_2$ and thus leaves no foreign components which have to be removed again by separate purification stages.

Since, furthermore, no special additional reactor equipment is in principle required, the process according to the invention surpasses the known processes both in terms of process engineering, with regard to space-time yield, and in terms of the possibility of directly using the polyethersiloxane purified in this manner in the abovementioned sensitive applications.

A further advantage of the process according to the invention is that, if required, it can be readily combined with the known processes. Thus, for example, the steam process for removal of the main fraction of troublesome component can be implemented upstream of the process according to the invention, which permanently eliminates the final traces of these fractions. Another possible variant is to add $H_2O_2$ simultaneously with the steam to the reaction mixture. Further modifications with one or more of the known processes are obvious.

In the exemplary non-limiting embodiments, performance characteristics of the siloxane/allylpolyether copolymers purified by the process according to the invention are described in more detail.

EXEMPLARY EMBODIMENTS

Reference Example

Preparation of the Polyethersiloxane to be Worked Up 7.5 g (=0.0125 mol) of a polyether having the average formula $$CH_2=CH-CH_2O-(C_2H_4O-)_{12}CH_3 \quad \text{(type A)}$$

301.8 g (=0.075 mol) of a polyether having the average formula $$CH_2=CH-CH_2O-(C_2H_4O)_{45}(C_3H_6O-)_{34}CH_3 \quad \text{(type B)}$$

56.6 g (=0.0375 mol) of a polyether having the average formula $$CH_2=CH-CH_2O-(C_2H_4O-)_5(C_3H_6O-)_{21}CH_3 \quad \text{(type C)}$$

and 16 mg of $C_2H_4C_5H_5N.PtCl_2$ were initially introduced into a flask which had been provided with a dropping funnel, stirrer, thermometer, gas inlet line and reflux condenser. Nitrogen was passed through the apparatus. After heating up to 120° C., 65.5 g (=0.1 mol of SiH) of a siloxane having the average formula $$H(CH_3)_2SiO-[(CH_3)_2SiO-]_{80}[(CH_3)HSiO-]_8Si(CH_3)_2H$$

were added dropwise. The reaction was allowed to continue for a further 2.5 hours. The SiH conversion was 99.4%.

After filtration over a Seitz-K-300 filter disk, a clear, slightly yellowish product characterized by a strong propionaldehyde odor was obtained.

EXEMPLARY EMBODIMENTS

Purification of the polysiloxane/polyoxyalkylene block copolymer obtained in the reference example

Exemplary Embodiment 1

A mixture of 200 g of crude polyethersiloxane and 10 g of a 3% strength aqueous $H_2O_2$ solution is aspirated (20 mbar) gradually into a 500 ml one-necked round-bottomed flask (attached to a rotary evaporator) heated to 120° C. and is freed from water and voltaile components in the course of 30 minutes.

The thermal separation was stopped only 5 minutes after the end of metering. 1.8 g of volatile components were separated off.

A colorless polyethersiloxane which had a neutral odor and remained odorless even after storage for 6 months at room temperature was obtained.

Exemplary Embodiment 2

A mixture consisting of 476.2 g of crude polyethersiloxane and 23.8 g of a 3% strength aqueous $H_2O_2$ solution was fed from a vessel thermostated at 100° C., in the course of 17 minutes, to a glass spray tower equipped with an atomizer nozzle. The spray tower and the downstream product vessel were heated to 100° C. and were at a pressure of 50 mbar. A demister layer, which served for breaking the foam resulting from the decomposition of the hydrogen peroxide, was integrated at the bottom of the spray tower.

The condensation of the volatile component (total mass: 25.6 g) was effected in a downstream cooled vessel.

The polyethersiloxane treated according to the invention was a colorless, odorless liquid which had no odor even after storage for 6 months. GC analysis showed the following purification effect:

| GC components | Crude polyethersiloxane (reference example) | Polyethersiloxane treated according to the invention (Exemplary embodiments 1/2) |
|---|---|---|
| Free propionaldehyde* | 30 ppm | <1/1 ppm |
| $D_4$ | 0.8% | <0.1/0.1% |
| $D_5$ | 0.4% | <0.1/0.1% |
| $D_6$ | 0.1% | <0.1/0.1% |

*Free propionaldehyde was determined by means of headspace gas chromatograph using a concentration method (solution in benzyl alcohol)

Testing of the Performance Characteristics:

Testing of the performance characteristics of the foam stabilizers prepared was carried out using a foam formulation in the following manner:

In each case 300 parts of a commercial polyether which was intended for the preparation of flexible polyurethane foams, had three hydroxyl groups in the average molecule and had a molecular weight of 3 500 were mixed with 15 parts of water, 15 parts of a commercial physical blowing agent, the corresponding amount of the foam stabilizer to be investigated, 0.33 part of diethylenetriamine and 0.69 part of tin octanoate with thorough stirring. After the addition of 189 parts of toluene diisocyanate (2,4 and 2,6 isomer mixture in the ratio of 4:1), stirring was effected with a Glatt stirrer for 7 seconds at 2 500 rpm and the mixture was poured into a box open at the top. A fine-pored foam which is characterized by the following parameters formed:

1. The sagging of the foam at the end of the rise phase (referred to as "sag" in the table below).
2. The number of cells per centimeter of foam which were determined microscopically.

The table below compares the measured values for 2 different concentrations (1.8 parts/1.5 parts) of the stabilizer obtained by the reference example and by exemplary embodiment 1:

| Example | Sag | Cells per centimeter |
|---|---|---|
| Reference example | 0.9/2.0 | 13/12 |
| Exemplary embodiment 1 | 0.7/1.4 | 16/15 |

This comparison documents the improvement in performance characteristics which the process according to the invention opens up for stabilizers for flexible polyurethane foams.

In addition to the elimination of an undesired odor and the reduction of free siloxane cycles, the foam stabilizer gained both in terms of the activity and from the point of view of increased fine cell content.

Empirical observation has shown clearly detectable, persistent spraying on the foam surface on going from the cream phase to the rise phase in the case of coarsening of the foam. When the polyethersiloxanes treated according to the invention were used, this characteristic spraying was not observed.

Comparative Example Carrier Gas:

In analogy to the process disclosed in JP-A-09095536, the polyethersiloxane obtained according to the reference example was subjected to a two-hour treatment with $N_2$ as stripping gas at 150° C. and reduced pressure (5 mmHg).

The proportion of volatile components which were stripped out by this process was 3.7%. The product obtained had a substantially stronger color than the starting material and still had a penetrating aldehyde odor. The GC headspace analysis indicated a concentration of 5 ppm of free propionaldehyde.

The evaluation of the performance characteristics as a foam stabilizer gives the following picture:

| Example | Sag | Cells per centimeter |
| --- | --- | --- |
| Comparative example | 0.9/1.5 | 15/14 |
| Exemplary embodiment 1 | 0.7/1.4 | 16/15 |

Exemplary Embodiment Steam:

180.5 g of an allylpolyethersiloxane obtained from analogous raw materials and having a structure type analogous to that in the reference example were initially introduced into a multi-necked round-bottomed flask having a stirrer and attached distillation bridge at 120° C. and were treated with steam at 155° C. via an inlet tube for 30 minutes (360 g). 2.8 g of volatile components were expelled and were condensed in a downstream receiver. No aldehyde odor could be detected.

Analogously to exemplary embodiment 1, the steam-treated material was evaluated as a foam stabilizer: 14/15 cells/cm; sag: 0.9/1.6.

After storage for 6 months, a substantial aldehyde odor was perceptible again.

The examples clearly show that the process according to the invention makes it possible, without the use of large amounts of water or contaminating additives, to prepare a product having a good to very good technical property profile from a foam stabilizer which is not very suitable per se and moreover to guarantee freedom from odor in the long term.

The above description is intended to be illustrative and not limiting. Various changes or modifications in the embodiments described herein may occur to those skilled in the art. These can be made without departing from the scope and spirit of the invention.

The invention claimed is:

1. A process for working up crude polyethersiloxanes, wherein volatile components in the crude polyethersiloxanes are removed said process comprising treating the crude polyethersiloxanes with $H_2O_2$ and separating off the volatile components.

2. The process according to claim 1, wherein the $H_2O_2$ is an about 0.1 to about 10% by weight aqueous solution of $H_2O_2$.

3. The process according to claim 2, wherein the $H_2O_2$ is an about 2 to about 8% by weight aqueous solution of $H_2O_2$.

4. The process according to claim 3, wherein the $H_2O_2$ is an about 3 to about 5% by weight aqueous solution of $H_2O_2$.

5. The process as claimed in claim 1, wherein the treatment with $H_2O_2$ is carried out at temperatures in the range from about 50 to about 140° C.

6. The process as claimed in claim 1, wherein $H_2O_2$ is used in amounts of from about 0.05 to about 5% by weight, based on the polyethersiloxane to be treated.

7. The process as claimed in claim 6, wherein $H_2O_2$ is used in amounts of from about 0.1 to about 1% by weight, based on the polyethersiloxane to be treated.

8. The process as claimed in claim 1, wherein the polyethersiloxanes are Si—C-linked allylpolyethersiloxanes.

9. The process as claimed in claim 1, wherein the polyethersiloxanes are polysiloxane/polyoxyalkylene block copolymers.

* * * * *

UNITED STATES PATENT AND TRADEMARK OFFICE
CERTIFICATE OF CORRECTION

| | | |
|---|---|---|
| PATENT NO. | : 7,612,159 B2 | Page 1 of 1 |
| APPLICATION NO. | : 10/740064 | |
| DATED | : November 3, 2009 | |
| INVENTOR(S) | : Burkhart et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Nineteenth Day of October, 2010

David J. Kappos
*Director of the United States Patent and Trademark Office*